United States Patent [19]
Tanaka

[11] Patent Number: 5,671,429
[45] Date of Patent: Sep. 23, 1997

[54] DOCUMENT PROCESSING SYSTEM PROVIDING FACILITATED MODIFICATION OF DOCUMENT IMAGES

[75] Inventor: Tsuyoshi Tanaka, Kanagawa, Japan

[73] Assignee: Fuji Xerox Co., Ltd., Tokyo, Japan

[21] Appl. No.: 69,394

[22] Filed: Jun. 1, 1993

[30] Foreign Application Priority Data

Jun. 2, 1992 [JP] Japan .................................. 4-165526

[51] Int. Cl.$^6$ ...................................................... G06T 1/00
[52] U.S. Cl. ...................... 395/792; 395/777; 395/761; 395/782; 395/615; 399/81; 399/183; 399/184; 399/185
[58] Field of Search ................................... 395/146, 150, 395/147, 148, 145, 109–110, 615, 761, 763, 777, 779, 782, 788, 10, 12; 345/173, 179–183, 112–116; 358/450; 382/180, 175; 355/266, 328; 399/42, 81, 182–183, 185, 184

[56] References Cited

U.S. PATENT DOCUMENTS

| | | | |
|---|---|---|---|
| 4,667,248 | 5/1987 | Kanno | 358/280 |
| 4,672,683 | 6/1987 | Matsueda | 345/173 |
| 5,142,355 | 8/1992 | Fujima | 358/75 |
| 5,142,620 | 8/1992 | Watanabe et al. | 395/164 |
| 5,214,755 | 5/1993 | Mason | 395/147 |

FOREIGN PATENT DOCUMENTS

| | | |
|---|---|---|
| 0 454 477A3 | 10/1991 | European Pat. Off. . |
| 0 454 477A2 | 10/1991 | European Pat. Off. . |
| 0 453 243A2 | 10/1991 | European Pat. Off. . |
| 0 453 243A3 | 10/1991 | European Pat. Off. . |
| 63-261271 | 10/1988 | Japan . |
| 2-223275 | 9/1990 | Japan . |
| 3-109874 | 5/1991 | Japan . |
| 5-101052 | 4/1993 | Japan . |
| 5-108641 | 4/1993 | Japan . |

OTHER PUBLICATIONS

Microsoft Works Users Guide Microsoft Corporation 1989 pp. 36–7, 52–3, 55, 58, 89, 90.
Brown, "On–line Images," PC User, p. S16(3), Oct. 25, 1989.
"Word Processing: NBI Begins Shipping Legacy 2.0," EDGE: Working–Group Computing Report (Product Announcement), vol. 2, issue 79, p. 36(1), Nov. 25, 1991.
42nd Japan Information Processing Society National Meeting Preparatory Theses 7Q–7 "On Evaluation Standards as to Document Expression Quality", 1991.
"Presentation & Documentation—Fuji Xerox Book" published by Fuji Xerox Co., Ltd. 1989.
"Technique of Performance of Business Document—Coloring" edited by Core Design Production Division, published by Nippon Keizai Shimbun Co., 1992.
Heiz–Ross et al., "Expert System," translated by AIUEO, published by Sangyo Tosho, 1985.
European Patent Office Search Report.

*Primary Examiner*—Joseph H. Feild
*Attorney, Agent, or Firm*—Finnegan, Henderson, Farabow, Garrett & Dunner, L.L.P.

[57] ABSTRACT

A document processing system which, in response to a simple instruction given by a user, is able to change and modify automatically the design of an input document. The document processing system includes target area instructor for instructing an area serving as an edit target to a document image stored in document image holding unit, target area extraction unit for extracting the instructed edit target area out of the document image, design instruction unit for instructing a desired document design to an output document, design parameter decision unit, responsive to the instruction from the design instruction unit, for deciding a parameter value relating to the document design of the target area, and output image generation unit for processing the document image of the edit target area on the basis of the decided parameter value to thereby generate an output image.

23 Claims, 13 Drawing Sheets

| AREA NO. | COORDINATE VALUE -1 (x, y) | COORDINATE VALUE -2 (x, y) | COORDINATE VALUE -3 (x, y) | COORDINATE VALUE -4 (x, y) | COORDINATE VALUE -5 (x, y) |
|---|---|---|---|---|---|
| 1 | (55, 60) | (104, 70) | (156, 65) | (205, 70) | (205, 185) |
| 2 | (64, 70) | (115, 71) | (165, 65) | (214, 75) | (205, 175) |
| 3 | (75, 60) | (126, 40) | (175, 30) | (225, 70) | (204, 165) |
| 4 | (155, 110) | - | - | - | |

| ITEM | SELECTION·INSTRUCTION |
|---|---|
| TARGET IMAGE | BAR GRAPH |
| COMP. ELEMENT | *AREA NO.1:BAR ELEMENT 1 (5 PORTIONS)<br>*AREA NO.2:BAR ELEMENT 2 (5 PORTIONS)<br>*AREA NO.3:BAR ELEMENT 3 (5 PORTIONS)<br>*AREA NO.4:BACKGROUND ELEMENT |
| FINISH IMAGE | ORTHODOX |

| AREA NO. | SORT OF IMAGE ELEMENT | CYAN AMOUNT (%) | MAGENTA AMOUNT (%) | YELLOW AMOUNT (%) | BLACK AMOUNT (%) |
|---|---|---|---|---|---|
| 1 | BAR ELEMENT 1 | 70 | 35 | 0 | 0 |
| 2 | BAR ELEMENT 2 | 40 | 20 | 0 | 0 |
| 3 | BAR ELEMENT 3 | 10 | 5 | 0 | 0 |
| 4 | BACKGROUND ELEMENT 1 | 5 | 0 | 20 | 0 |

FIG. 20

```
(RULE00100
  (IF
    (=<($GET "NO. OF BAR COMP. ELEMENTS OF BAR GRAPH") 3)
    (==($GET "FINISH IMAGE") "ORTHODOX")
  THEN
    ($PUT "COLOR OF BAR ELEMENT 1 (AMOUNTS OF CYAN,MAGENTA,YELLOW AND BLACK)"
      (70,35,0,0))
    ($PUT "COLOR OF BAR ELEMENTS n (n≥2) (AMOUNTS OF CYAN,MAGENTA,YELLOW AND BLACK)"
      (VALUE OF[n-1]-30,VALUE OF[n-1]-15,0,0))
  )
)
```

FIG. 21

```
(RULE00110
  (IF
    (>($GET "NO. OF BAR COMP. ELEMENTS OF BAR GRAPH") 3)
    (==($GET "FINISH IMAGE") "ORTHODOX")
  THEN
    ($PUT "COLOR OF BAR ELEMENT 1 (AMOUNTS OF CYAN,MAGENTA,YELLOW AND BLACK)"
      (70,35,0,0))
    ($PUT "COLOR OF BAR ELEMENTS n (n≥2) (AMOUNTS OF CYAN,MAGENTA,YELLOW AND BLACK)"
      (VALUE OF[n-1]-10,VALUE OF[n-1]+10,0,0))
  )
)
```

FIG. 22

```
(RULE00300
 (IF
  (= = ($GET "NO. OF BACKGROUND COMP. ELEMENTS OF BAR GRAPH") 1)
  (= = ($GET "FINISH IMAGE") "ORTHODOX")
  THEN
  ($PUT "COLOR OF BACKGROUND ELEMENTS (AMOUNTS OF CYAN, MAGENTA, YELLOW AND BLACK)"
   (5, 0, 20, 0))
 )
)
```

DOCUMENT PROCESSING SYSTEM PROVIDING FACILITATED MODIFICATION OF DOCUMENT IMAGES

BACKGROUND OF THE INVENTION

1. Field of the Invention

The present invention relates to a document processing system which, in responsive to a user's simple instruction, automatically changes the design of a document into a design having higher quality to be output.

2. Description of the Related Art

Recently, a variety of document creating machines such as a DTP (Desk Top Publishing), a word processor and the like, which is capable of creating a document easily in an ordinary office, has been proposed and employed widely. Particularly, there has been increased a document creating machine having a high function which is able to widely select various parameters such as the page layout, character type, size and other contents of a document. Due to this development, if a document creator having good knowledge and sufficient experience spends sufficient time, then he or she can make up a high quality of document which reflects his or her intention.

However, in order that an ordinary user can make good use of such high-function document treating machine, the ordinary user must learn very complicated operations. And, such an ordinary user has no idea at what value the parameter, which has been widely selectable, is set in order to be able to create a high-quality document reflecting his or her creating intention. As a result, it is common that the ordinary user cannot but create only the document that is unlikely to have high quality, that is, that looks poor and is hard to read.

In order to solve the above problem, there is proposed a technique to provide a document creating machine with a backup function for making up an attractive and high-quality document in compliance with the intention and use of a document creator in Published Unexamined Japanese Patent Application Nos. Hei-5-101052 and Hei-5-108641.

However, this technique is developed to be suitable for an electronic document and thus it cannot be applied to either a document which has been printed on paper as an ordinary document by a document creating machine or a document which is written on paper originally by hand.

On the other hand, there is a copying machine that acts as a machine having functions suitable for reading a paper document to be modified and reproduced. While, strictly speaking, the basic function of the copying machine is to produce a document on which a manuscript is reproduced faithfully, with the widespread use of a digital copying machine, Published Unexamined Japanese Patent Application No. Hei-2-223275 discloses an example of a new type copying machine having a document processing function. However, in these techniques, similarly to the document creating machine with a high function described above, a user must give minute specifications including the part(s) of the document to be processed, way to process the document and the like. Also, to make good use of them, the user must carry out very complicated operations. Further, an ordinary user has no idea what parts of the document are to be processed and how to process them in order to produce a document having high quality, which is acceptable to the creator's intention. That is, in the long run, these techniques have been found not so useful in changing an input document so as to have a higher quality of document.

Further, while a variety of color copying machines has been proposed, coloring a mono-tone document or changing the color of a document requires skillful operators having high sense. In addition, such color changing or coloring operation is very complicated and takes much time and an ordinary user, who has little knowledge as to a color scheme and has little sense of design, then finds it extremely difficult to provide an output document of a high quality.

In view of the above described difficulties accompanying the conventional devices, Published Unexamined Japanese Patent Application Nos. Hei-3-109874 and Sho-63-261271 disclose such a technique as enables even the ordinary user of little knowledge as to a color scheme little sense of design to color a document or improve the appearance of the document.

However, in any of the above techniques, elements to be colored and edited are limited and the output patterns thereof are simply unified, which are insufficient to realize a function to output a document which reflects the creating intention of the user and is of a high quality in design.

SUMMARY OF THE INVENTION

The present invention aims at eliminating the drawbacks found in the above-mentioned conventional systems. Accordingly, it is an object of the invention to provide a document processing system which, on receiving a simple instruction from a user such as an instruction as to an area to be edited, the desired usage of a document, the finished document image or the like, is able to change or modify automatically the design of the input document, to process the input document into a document of such design as instructed, and then to produce the processed document.

In attaining the above object, according to the invention, there is provided a document processing system which includes document image holding means (designated by 111 in FIG. 1, 1181 in FIG. 18) for storing a document image, target area instruction means (designated by 12 in FIG. 1, 182 in FIG. 18) for designating an area to be edited on the document image stored in the document image holding means, target area extraction means (designated by 13 in FIG. 1, 183 in FIG. 18) for extracting the area to be edited instructed by the target area instruction means from the document image, design instruction means (designated by 14 in FIG. 1, 184 in FIG. 18) for instructing a desired document design on an output document, design parameter decision means (designated by 15 in FIG. 1, 185 in FIG. 18) for deciding a parameter value on the document design in the target area in accordance with an instruction from the design instruction means, and output image generation means (designated by 16 in FIG. 1, 186 in FIG. 18), in accordance with the parameter value decided by the design parameter decision means, for processing the document image in the edit target area extracted by the target area extraction means to thereby generate an output image.

If a user instructs an edit target area by means of the target area instruction means, then the target area extraction means extracts a document image area which corresponds to the instruction. Also, the user gives a simple instruction a desired use or a desired finish image by means of the design instruction means. In accordance with the user's instruction, the design parameter decision means 15 decides the design parameter of the area instructed as the edit target. The output image generation means 16, in accordance with the decided design parameter, processes the document image and generates a predetermined output image.

An edit target area is instructed by the target area instruction means, and an identifier (an area number) for identifying an area and information for indicating the position of an instruction point are sent to the target area extraction means. In a concrete embodiment, the target area instruction means includes an edit pad, an edit instruction pen, and a message display panel (FIGS. 6 to 8). The edit pad is provided with a portion to place thereon the manuscript document of the document image to be stored in the document image holding means and a portion to detect an instruction point indicated by the edit instruction pen. The message display panel is used to guide how to instruct the target area for the user. If the user pushes the position of the manuscript document placed on the edit pad by use of the edit instruction pen in accordance with a massage displayed on the massage dismay panel, then the target area instruction means detects the position that is pushed and outputs a signal indicating the position.

Further, in a concrete embodiment, the target area instruction means has layout images (designated by 61 in FIG. 6) previously prepared for every kinds of edit targets (for example, a bar graph and a circular graph respectively shown in FIG. 5), and the message display panel displays with highlight a target area (that is, a portion designated by 62 in FIG. 6) in which the layout image corresponding to the kind of the edit target must be instructed by the edit instruction pen and also displays an identifier (designated by 63 in FIG. 6) corresponding to the target area. Thanks to this, the user is able to understand easily the target area to be instructed by the edit instruction pen and thus is able to indicate the instruction point correctly.

The target area extraction means, on the basis of the instruction points detected by the edit pad in the target area instruction means and identifiers respectively corresponding to the instruction points, extracts a closed area including the respective instruction points from the document image stored in the document image holding means (see FIGS. 12 to 15) and decides the extracted closed area as the edit target area.

The design instruction means, according to an embodiment of the invention, includes an operation panel (FIG. 10) which is used to display design instruction items such as the kinds of the edit targets, the finish image of the document and the like, and to select a desired item from the design instruction items.

Also, the design parameter decision means, according to an embodiment of the invention, includes table means (151 in FIG. 1, FIG. 9) which is able to index a parameter value relating to the document design in accordance with the instruction content of the design instruction means. In a further concrete embodiment, the table means includes a first table to indicate the correspondence between design instructions and table numbers respectively corresponding to the design instructions, and a second table to indicate the correspondence between area identifiers and color parameters for determining the color of each of areas having the identifiers.

The design parameter decision means, according to another embodiment of the invention, includes a knowledge data base (designated by 1852 in FIG. 18) in which knowledge information on the document design is stored, and inference processing means (designated by 1851 in FIG. 18) which, in accordance with the instruction of the design instruction means, executes an inference processing by use of the document design information stored in the knowledge data base. According to this embodiment, it is possible to set a more proper design parameter.

As described above, according to the invention, only by receiving from a user a very simple instruction such as the use to be desired by the user, the finish image of the document and the like, the design of the input document can be changed automatically, that is, can be processed into a document having a design matched to the instruction and then can be output.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 20 is a view of an example of knowledge in a knowledge data base;

FIG. 21 is a view of an example of knowledge in a knowledge data base; and,

FIG. 22 is a view of an example of knowledge in a knowledge data base.

DESCRIPTION OF THE PREFERRED EMBODIMENTS

Figure 1:
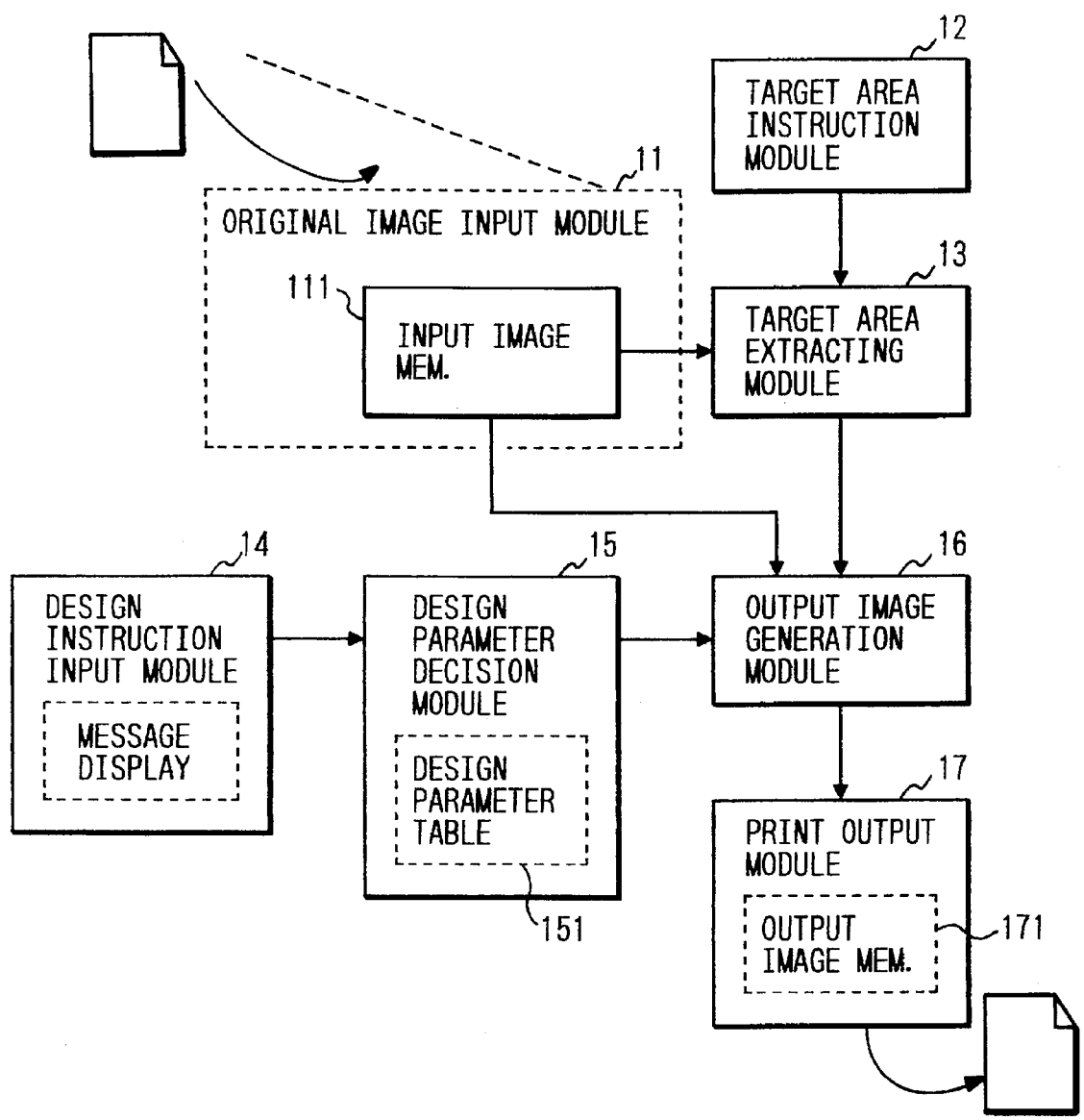
FIG. 1 is a block diagram showing the structure of a first embodiment of a document processing system according to the invention.

FIG. 1 is a block diagram showing a first embodiment of a document processing system according to the present invention, which is available in a copying machine.

As shown in FIG. 1, the present document processing system includes a manuscript image input module 11 which receives a manuscript document as a digital image and allows an input image memory 111 to store the manuscript document, a target area instruction module 12 which designates an area to be edited to the document image, a target area extraction module 13 which, in responsive to an instruction given by the target area instruction module 12, extracts the target area from the document image stored in the input image memory 111, a design instruction input module 14 which is used to instruct the kind of the document to be edited, the finish image of the document desired by a user and the like, a design parameter decision module 15 which, in accordance with the content of the instruction given by the design instruction input module 14, decides the parameter value of the design of the target area, an output image generation module 16 which, in accordance with the design parameter value decided by the design parameter decision module 15, processes the area image extracted by the target area extraction module 12 and generates an output image, and a printout module 17 which visualizes on paper the document image that is generated by the output image generation module 16.

The manuscript image input module 11, which is the same as the mechanism of an image scanner, illuminates a long and narrow area in a main scanning direction with a light source while shifting a read part consisting of the light source and an image sensor in a sub scanning direction, collecting the reflected light by means of a lens, converts the collected light into an electric signal by use of a CCD image sensor and the like, and takes in the electric signal as a binary digital image into the input image memory 111. Of course, alternatively, the amplitude of the reflected light may be input through an AD converter as multi-value images and then converted into binary values by means of a digital image processing.

The target area instruction module 12 realizes the target area instruction by means of an edit pad, an edit instruction pen and the like attached thereto. Also, the target area instruction module 12 includes layout structure models previously prepared respectively for every kind of edit targets such as a bar graph, a circle graph and the like. The module 12 displays the layout of the model on a message display panel used in common with the design instruction input module 14, and also displays and highlights the area of an element (such as bar elements No. 1, - - - , background element and the like which will be discussed later) having the same meaning on the displayed layout. At the same time, the module 12 displays an identifier (an area number) corresponding to the area, thereby guiding to the user the target area to be instructed by means of the edit instruction pen.

In accordance with the above guidance, the user arranges the document to be edited on the edit pad and then presses and instructs the edit target portion by means of the edit instruction pen or the like. In this case, the instruction is given in parallel with a design instruction (which will be described later) given by the design instruction input module 14. The area instructed here is sent to the target area extraction module 13 as electric signals which represent coordinate from a reference point and an instructed order, respectively.

The target area extraction module 13, in accordance with the instruction from the target area instruction module 12, extracts the image area to be edited out of the manuscript image transmitted from the manuscript image input module, and delivers the image area together with the identification number to the output image generation module 16. This can be realized by use of an existing technique such as what is disclosed in Published Unexamined Japanese Patent Application No. Hei-2-223275.

Pre-processings such as an inclination correction processing, a noise removal processing and the like may be performed before the above processing.

Figure 2:
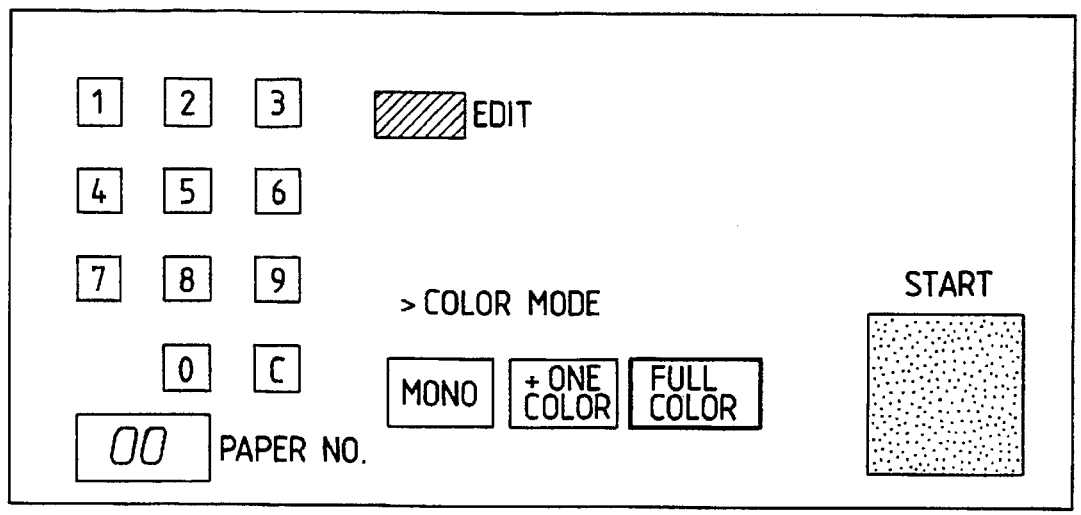
FIG. 2 is a view of an example of a design instruction input module.

The design instruction input module 14 can be realized by a select button disposed on an operation panel provided in the present system, a touch input type of display serving also as a display part for displaying a message explaining an operation procedure, and the like. In operation, if the button is depressed, then the design instruction input module 14 delivers data corresponding to the instruction to the design parameter decision module 15. In FIG. 2, there is provided a button called "edit" as a design instruction selection and, by pressing down the "edit" button, the edit instruction can be started. If the edit button is depressed, then a message indicating an operation procedure is displayed and, in accordance with the instruction, the item selection as well as the area instruction in the target area instruction module 12 are executed.

In addition to the edit button, although not shown in FIG. 2, there are prepared a select button for selecting an output paper size prepared in an ordinary copying machine and other buttons. If a suitable button is selected out of these buttons, then a signal corresponding to this selection is sent to the design parameter decision module 15.

The design parameter decision module 15, in accordance with an instruction input by the user, decides the data of the design parameter of the target area from a parameter table with has been previously registered, and then delivers the data to the image generation module 16. The parameter table, which is classified by the kinds of the edit target images and by the contents of the design instructions, is stored in a ROM (Read Only Memory). If the parameter table having a large quantity of data is required, a magnetic disk device or the like may be replace for the ordinary ROM.

The data to be stored in the parameter table are decided on the basis of various kinds of information necessary for decision of the document design, such as quantitative data obtained by a subjective evaluation method or other similar methods, as stated in No. 42nd Japan Information Processing Society National Meeting Preparatory Theses 7Q-7 (1991). "On Evaluation Standards as to Document Expression Quality", qualitative or quantitative data as stated in "Presentation & documentation—Fuji Xerox Book, published by Fuji Xerox Co., Ltd. 1989", or "Technique of Performance of Business Document—Coloring, edited by Core Design Production Division—Fuji Xerox D Promotion Group, published by Nippon Keizai Shimbun Co., 1992", or data representing arrangements decided by the internal rules.

The output image generation module 16 receives the data of the design parameters for the target image area from the design parameter decision module 15, and also receives the data representing the respective target image areas from the target area extraction module 13. Further, the module 16 receives the input images from the manuscript input module 11. And, the output image generation module 16, in accordance with the parameters received from the design parameter decision module 15, processes the respective edit target image areas to generate an output image on the output image memory 171, and finally generates a document image which has such a design image as instructed.

The printout module 17 transfers onto paper the output image on the output image memory 171 by use of a laser beam print technique, and discharges the transferred output image. Alternatively, of course, this can be realized by using a marking technique such as an ordinary paper thermal transfer technique besides the laser beam, or by using a single color or full color printing technique.

Next, an operation of the first embodiment of the invention will be described hereinbelow by use of an actual example of a document. As such document examples, there is shown a bar graph in FIG. 3 and there is shown a flow chart of a processing to be performed on the bar graph in FIG. 4.

Figure 3:
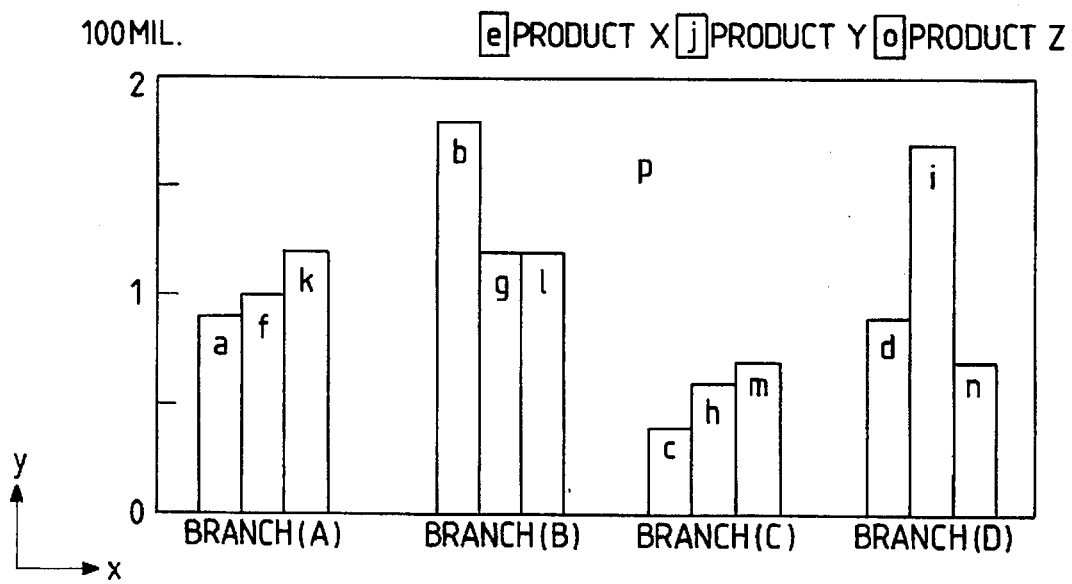
FIG. 3 is a view of an example of an input document.
Figure 4:
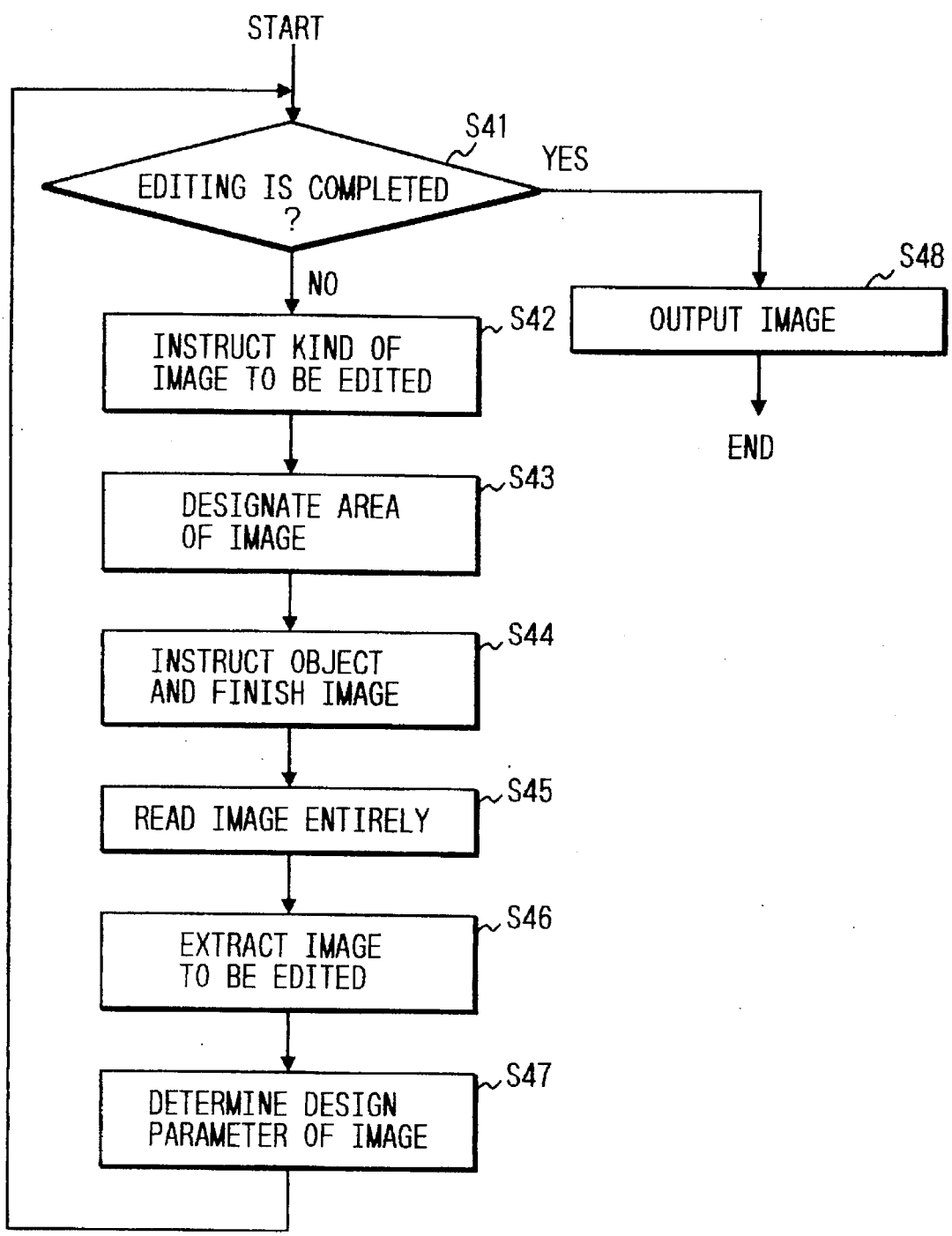
FIG. 4 is a flow chart of a processing to be performed in the first embodiment.

Hereinafter, the coordinate system is expressed in such a manner that, as shown in FIG. 3, a direction proceeding to the right in the page is expressed as an x coordinate and a direction proceeding upwardly in the page is expressed as a y coordinate. At first, the user puts the document shown in FIG. 3 on the edit pad and presses down the edit button on such an operation panel as shown in FIG. 2 to thereby instruct the start of editing.

Figure 5:
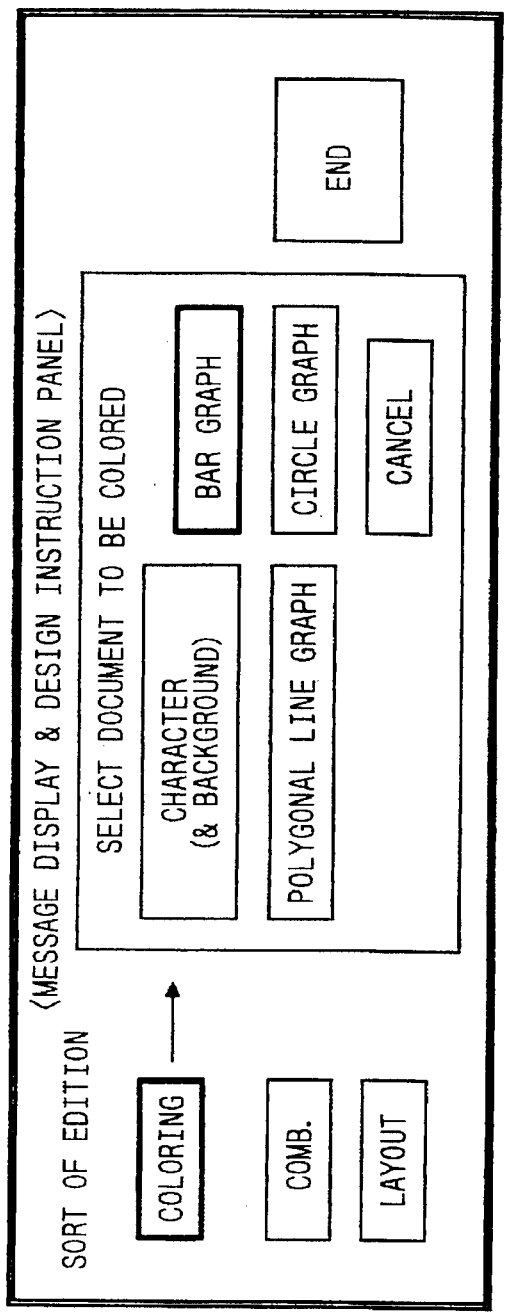
FIG. 5 is a view of an example (1) of a design instruction input;.

In response to this, such edit kind choices as shown in FIG. 5 are displayed on a message display & design instruction panel which is composed of a display of a touch input type. For example, if "coloring" is chosen out of the choices, then a choice for a document to be colored is displayed. From the document choices, for example, there is selected a "bar graph" as an target image by giving color to the portion of the bar graph shown in FIG. 3 for the purpose of easy view (Step S42).

If the above selection is completed, then the area of the image is instructed by the user (Step S43).

Figure 6:
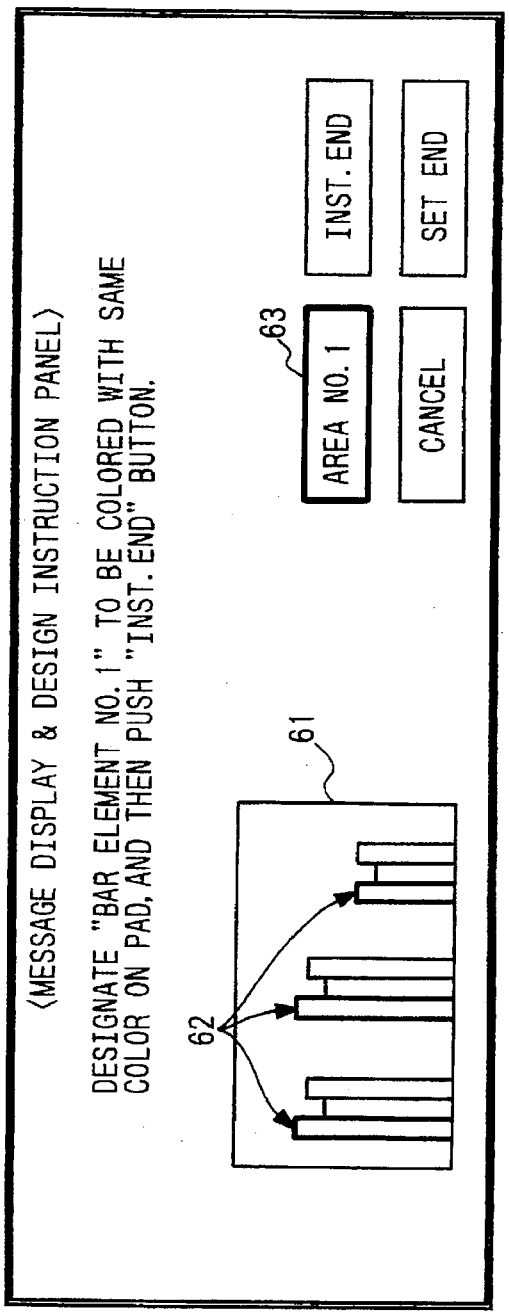
FIG. 6 is a view of an example (1) of a message display for target area instruction.
Figure 7:
FIG. 7 is a view of an example (2) of a message display for target area instruction.
Figure 8:
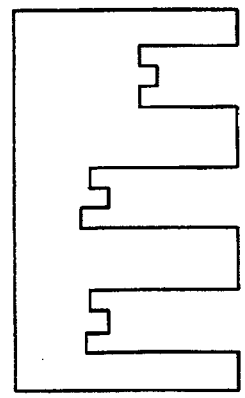
FIG. 8 is a view of an example (3) of a message display for target area instruction.

That is, such a message as shown in FIG. 6 is displayed on the message display & design instruction panel, which explains how to instruct the area in the target area instruction module 12. The user, in accordance with the message, at first instructs the areas a to e of a manuscript (FIG. 3) put on the edit pad as an area number 1 (area No. 1) by pointing one point of each of the areas with an edit instruction pen. If this instruction is ended, then such a message as shown in FIG. 7 is displayed on the message display & design instruction panel and, in accordance with the message, the user confirms this message as an area number 2 and instructs the areas f to j shown in FIG. 3. Next, if the instruction selection of the bar elements is completed, then there is displayed such a message as shown in FIG. 8 and then the background of the graph is selected and instructed similarly. In this manner, of all of selection instructions are completed in accordance with the messages, then the user presses down a "setting completion" button to thereby complete the area instruction. The thus instructed areas are respectively transmitted, in the form of numerals respectively indicating such instruction area numbers as shown in FIG. 9 and the coordinate values of the respective instruction points, to the target area extraction module 13.

Figures 9, 10:
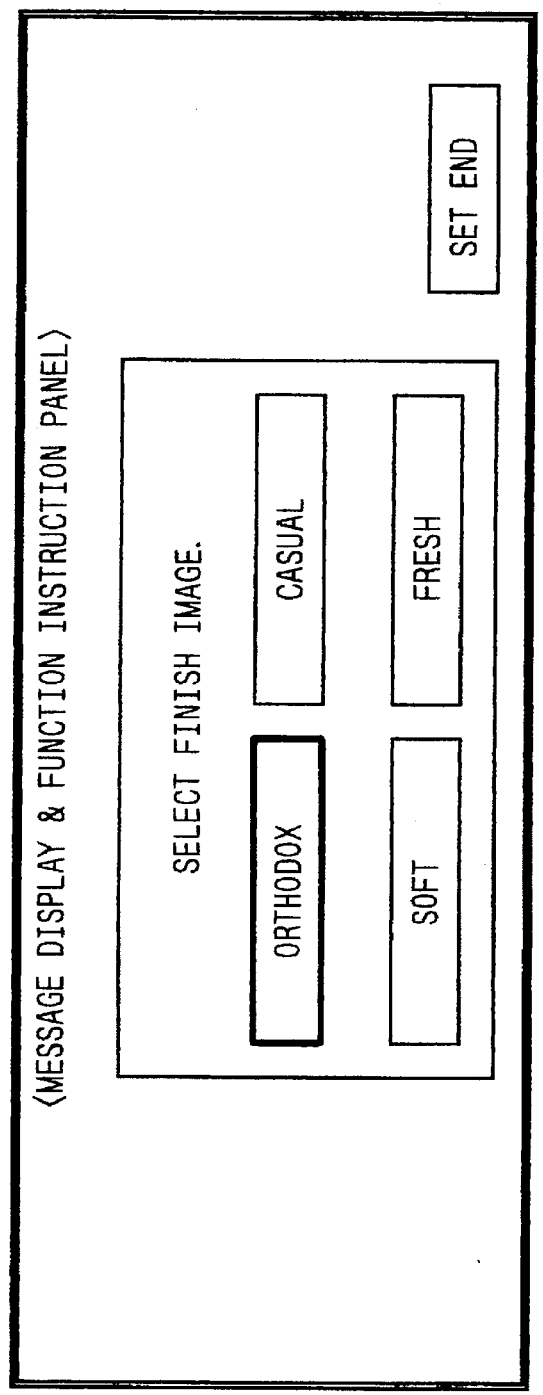
FIG. 9 is a view of an example of a target are instruction result.
FIG. 10 is a view of an example (2) of a design instruction input.

If the area instruction is completed, then such a message as shown in FIG. 10 is displayed on the message display & design instruction panel and a finish image is selected (Step S44).

Responsive to this instruction, the decision result in the design parameter decision module 15 is caused to vary even in the target area. If the selection is completed, then the setting completion button is instructed.

Figures 11, 12:
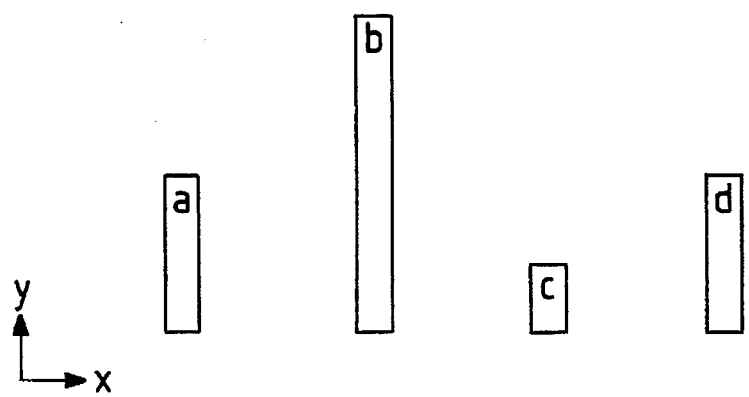
FIG. 11 is a view of an example of a design instruction decision.
FIG. 12 is a view of an example (area number 1) of a target area extraction result.
Figure 13:
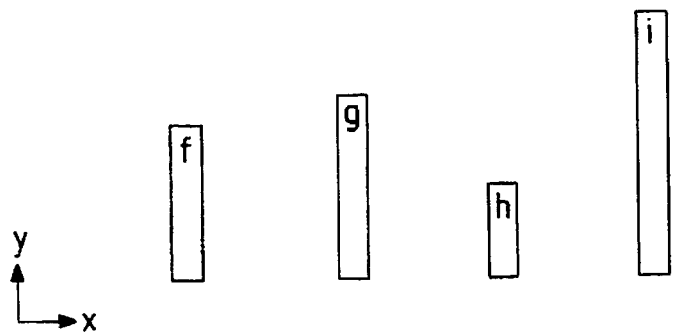
FIG. 13 is a view of an example number 2) of a target area extraction result.
Figure 14:
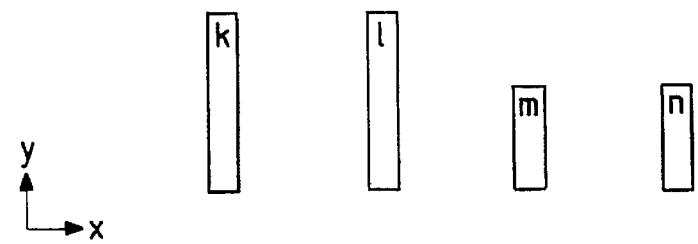
FIG. 14 is a view of an example (area number 3) of a target area extraction result.
Figure 15:
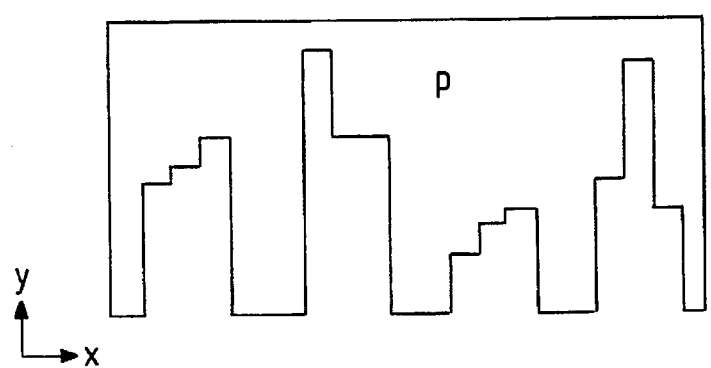
FIG. 15 is a view of an example (area number 4) of a target area extraction result.

The design instruction selected in this manner is sent to the design parameter module 15 in such a form as shown in FIG. 11.

In the above-mentioned manner, if the design instruction and target area instruction are completed, then the user moves the manuscript document to the image input module 11 and then presses down an operation start button.

Responsive to this, the image input module 11 starts its operation to store the image of the manuscript document in the input image memory 111 which is composed of an image memory (Step S45).

The target area extraction module 13, in accordance with the instruction given by the target area instruction module 12, extracts the corresponding image area out of the images that are transmitted from the input image memory 111 (Step S46).

On the basis of the area numbers and instruction points coordinates shown in FIG. 9, there is extracted a closed area including the respective instruction points. As a result of this, there are extracted such images as shown in FIGS. 12 to 15, respectively. This image area, together with the area number, is sent to the output image generation module 16.

Figures 16, 17:
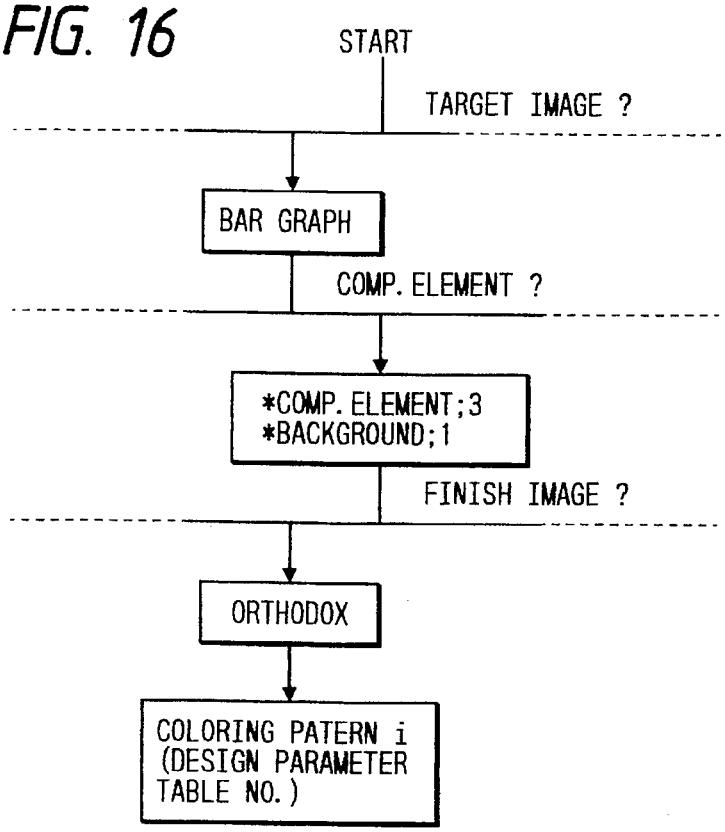
FIG. 16 is a view of an example of a procedure for design parameter decision.
FIG. 17 is a view of an example of the content of a design parameter.

On the basis of the information (FIG. 11) from the design instruction input module 14, the design parameter decision module 15 decides a corresponding color arrangement pattern i (design parameter table number) as shown in FIG. 17 according to such a procedure as shown in FIG. 16 (Step S47).

The design parameter table is composed of area numbers corresponding to the area numbers transmitted from the target area extraction module 13 and values representing the amounts of recording colors for every area numbers. The design parameters decided in this manner are then sent to the output image generation module 16.

The output image generation module 16 makes the area numbers of the design parameter table to correspond to the area numbers extracted by the target area extraction module 13, and generates output images for edit target areas as instructed by the design parameter table in every areas (Step S48).

On each of image areas not to be edited, there is performed a normal processing to reproduce the manuscript faithfully, thereby generating an output image.

The thus generated output images are then sent to the printout module and, in accordance with a normal process of a full color image output, they are recorded and displayed on paper or the like as images with the bar elements portion and background portion of the graph colored.

According to the present embodiment, if the edit target areas are instructed by the target area instruction module 12 and a simple operation to instruct the document finish image, document kind and the like is performed by the design instruction input module 14, then the edit target areas are processed in accordance with the color arrangement of the designs decided by the design parameter decision module 15 to thereby generate the output images. For this reason, even a user, who has no knowledge as to the document design, is able to easily make up a document whose design has a good looking color arrangement.

In the above-mentioned first embodiment, description has been given of an example in which the elements of a graph document, which is a document composed of figure elements, are instructed as the edit target areas. However, the invention is not limited to this but, in general, the present invention can be arranged in such a manner that any kinds of elements of the document images can be instructed as the edit target areas.

For example, in a document composed of character blocks such as a thesis, report or the like, the character blocks to be given identifiers such as a title, an author, a body and the like can be specified by the target area instruction module.

Also, in the first embodiment, description has been given of an example in which the color arrangement of the instructed edit target area is decided as a design parameter. However, the invention can also be arranged in such a manner that not only the color arrangement but also other layout elements such as the sizes, arrangement and other elements of areas can be determined as design parameters.

Now, description will be given below of a second embodiment of a document processing system according to the invention. In the second embodiment, instead of referring to a table as a design parameter decision module as in the first embodiment, there are used, for example, a knowledge base written in an IF-THEN rule form and an inference engine which uses the knowledge base to perform a forward or backward inference.

Figure 18:
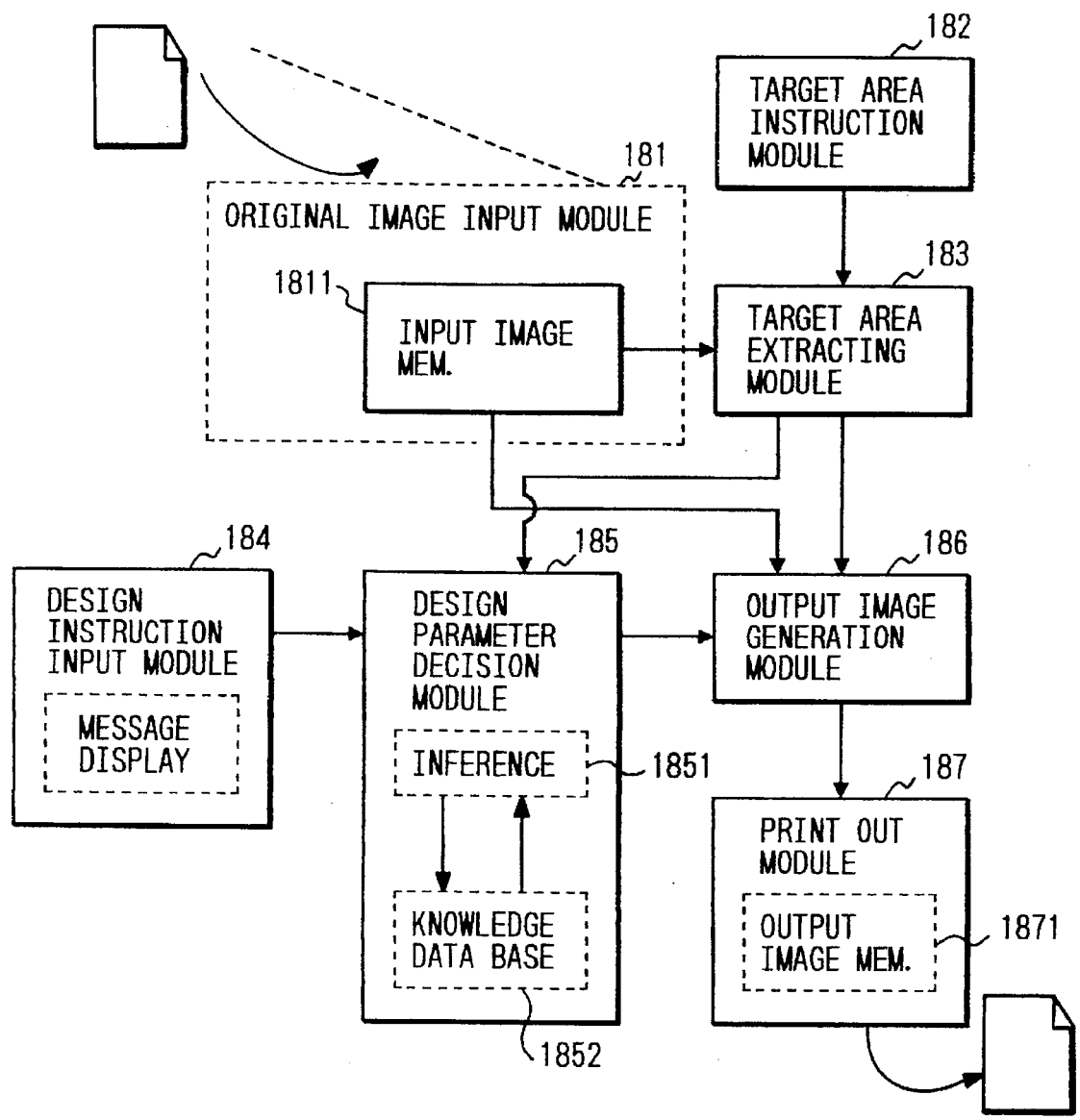
FIG. 18 is a block diagram of the structure of a second embodiment of a document processing system according to the invention.

That is, as shown in FIG. 18, the design parameter decision module 185 includes a knowledge data base 1852 which holds the knowledge that regulates the instruction items from the design instruction input module 184, design parameters and the mutual relations between them, and an inference mechanism (inference engine) 1851 which, on the basis of the instruction signals from the design instruction module 184 and the information from the target are extraction module 183, performs some inference such as forward inference, backward inference or the like while referring to the knowledge data base 1852, thereby deciding the design parameters.

Now, description will be given below of an example of the operation procedure of the inference mechanism with reference to FIG. 19.

Figure 19:
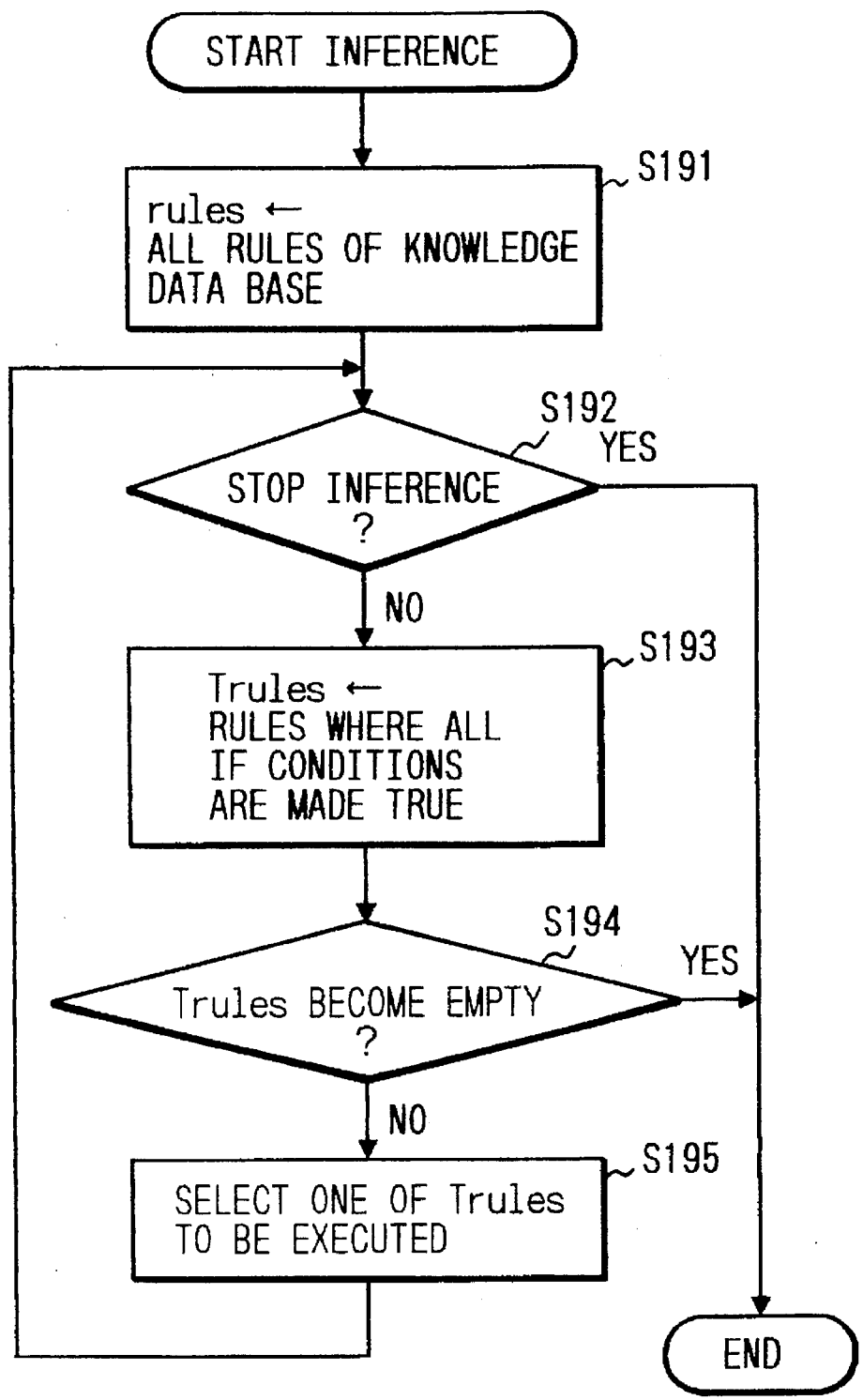
FIG. 19 is a flow chart of an inference processing to be performed in the second embodiment.

The design parameter decision module 185, as shown in FIG. 19, on receiving an instruction to start inference, at first, allows the inference engine to take out all rules written in the IF-THEN form from the knowledge data base 1852 and to decide these as rules (Step S191).

Next, based on the data transmitted thereto from the design instruction input module 184 and target area extraction module 183, the design parameter decision module 185 finds out all rules in which all conditions written in the IF condition part are true, and decides the rules as Trules (Step S193).

Then, the decision modules 185 selects only one rule out of the Trules and executes the execution contents written in the THEN execution part of the selected Trule (Step S193). Such rule selection and execution are repeated until the Trules become empty (it is judged by Step S194) or until there is output an inference stop instruction by the THEN execution part (it is judged by Step S192). In this manner, the design parameter decision module 185 can decide the design parameter suited for the design instruction.

The knowledge data base 1852 is used to store, as data, a relation between the information representing the use, finish image and the like of a document by means of some knowledge expression method such as the IF-THEN rule form, frame form or the like and the design parameters such as the color arrangements of the respective target areas and the like. The data base 1852 includes a magnetic disk device, an optical disk or the like. The contents of the knowledge stored in the knowledge data 1852 are those which are written in such a format as shown in FIG. 20; for example "when the number of the bar component elements of a bar graph is 3 or smaller and the finish image thereof is an orthodox document, then the color (Cyan amount, Magenta amount, Yellow amount, Black amount) of a bar element 1 is (70, 35, 0, 0) [%], and the colors (Cyan amounts, Magenta amounts, Yellow amounts, Black amounts) of bar elements 2 and its following bar elements decrease sequentially in such a manner that the Cyan amounts decrease by 30 [%] and the Magenta amounts decrease by 15 [%] sequentially.".

And, the contents of the knowledge themselves are, for example, qualitative data obtained by a subjective evaluation method or a similar method as stated in the "Evaluation Standards on Document Expression Quality", the 42nd Information Processing society National Meeting Preparatory These 7Q-7, in 1991; or such qualitative or quantitative data as stated in the "Presentation & documentation", by Fuji Xerox, 1989 or in the "Business Document Performance Technique-coloring" edit by "Fuji Xerox D Promotion Group, Core Design Committee, published by Nippon Keizai shimbun, 1992"; or other various kinds of information necessary to decide the document design such as data representing rules stipulated in the internal house regulations.

The method of expression of knowledge and the structure of an inference engine in an ordinary knowledge data base are discussed in detail, for example, in the "Expert System", edited by F. Heiz-Ross et al., translated by AIUEO, published by Sangyo Tosho, 1985.

The remaining component elements of the second embodiment are substantially similar to those of the first embodiment.

On the basis of the first embodiment, description will be given below concretely of the operation of the second embodiment by way of the document processing system shown in FIG. 18 and the document shown in FIG. 3.

According to the second embodiment, the design parameter decision module 185, on the basis of an instruction signal from the design instruction input module 184 and information from the target area extraction module 183, refers to the knowledge data 1852 and infers and decides the optimum value for each of individual design elements.

For example, it is assumed that the selection information of "coloring target: bar graph" "number of bar elements: 3" "finish image: orthodox" is given from the design instruction input module 184 to the design parameter decision module 185.

In this case, in the design parameter decision module 185, there is executed such a rule as shown in FIG. 20 according to the operation procedure shown in FIG. 19. This rule is a rule which is selected when the IF condition part is true due to the information such as "number of bar elements: 3" "finish image: orthodox" and the like. This means that, with Cyan amount of 70%, Magenta amount of 35%, Yellow amount of 0% and Black amount of 0% as basic colors, if the number of bar elements is 3 or smaller, then in a color arrangement in which similar colors (that is, the same hue colors) are arranged with different densities thereof, the orthodox color arrangement as a bar graph is preferred to have such difference between adjoining colors as Cyan of 30 [%] and Magenta 15[%].

On the other hand, when the number of bar elements is not 3 but 4, there is executed a rule shown in FIG. 21 instead of FIG. 20. This means that, with cyan amount of 70%, Magenta amount of 35%, Yellow amount of 0% and Black amount of 0% as basic colors, if the number of bar elements is 4, then it is preferred to arrange colors with the same densities but with different hues.

In addition, there are executed successively other rules such as a rule shown in FIG. 22 to thereby decide the values of other design elements when all of the necessary design parameters are decided, then the inference is ended.

The values of the design parameters obtained in the above-mentioned manner are sent to the output image generation module 186 and are then processed similarly to the first embodiment.

According to the second embodiment, it is possible to obtain a document image which is suitable for the original document and has improved color and design.

As described heretofore, according to the invention, a user having no knowledge as to document design is able to make up easily a document with a good looking and high quality design suited for his or her intention or the use of the document, simply by giving a simple instruction on the basis of an existing document.

In other words, according to the invention, if the user instructs the target area by use of the target area instruction means and at the same time instructs a desired use or a desired finish image by use of the design instruction means, then the design parameters are accordingly decided by the design parameter decision means and also the output image generation means processes the document image for the specified target area to thereby generate a given output image. Thanks to this, even a user who does not have knowledge as to document design, is able to change an original document into a document with a desired design of high quality.

Also, according to one embodiment of the invention, due to the fact that document design knowledge information is prepared as a knowledge data base and design parameters are decided by means of an inference processing, it is possible to decide a document design based on the knowledge of a design expert and suitable for carious kinds of document images.

What is claimed is:

1. A document processing system comprising:

document image holding means for storing data representing a document image and including at least some non-character image data;

target area instruction means designating, for editing, an image target area including at least a portion of the non-character image data in the document image stored in said document image holding means, said target area instruction means further comprising a display which displays respective model images which have been prepared for respective kinds of image target areas, and wherein the displayed model images guide a user on how to instruct the image target area;

target area extraction means for extracting the image target area designated by said target area instruction means from the document image;

design instruction means for generating at least a selected one of a plurality of design instructions to generate a desired document design for an output document;

design parameter decision means for determining values of design parameters determined in accordance with the one design instruction for the document design in the image target area and operative to modify at least the portion of the non-character image data in the image target area; and output image generation means for processing and modifying at least the document non-character image data in the image target area extracted by said target area extraction means in accordance with the parameter values determined by said design parameter design means, thereby to produce an output image.

2. A document processing system as set forth in claim 1 wherein said target area instruction means comprises an edit pad having a portion to place thereon a manuscript document of said document image stored in said document image holding means and a portion to detect an instruction point instructed by an edit instruction pen, said edit instruction pen instructing a desired point in said manuscript document on said edit pad.

3. A document processing system as set forth in claim 2 wherein said target area instruction means comprises a layout structure having the respective model images, and wherein said display displays the model images by highlighting the image target areas to be instructed by said edit instruction pen and also displays identifiers respectively corresponding to the areas.

4. A document processing system as set forth in claim 3 wherein said target area extraction means, on the basis of the instruction points detected by said edit pad in said target area instruction means and said identifiers respectively corresponding to the instruction points, extracts closed areas respectively including each of the instruction points from the document image stored in said document image holding means, and decides the closed areas as edit target areas.

5. A document processing system set forth in claim 1 wherein said design instruction means comprises an operation panel to display design instruction items and to select a desired design item from the design instruction items.

6. A document processing system as set forth in claim 1 wherein said design parameter decision means comprises table means which, in accordance with the instruction contents of said design instruction means, allows indexing of the parameter values concerning the document design.

7. A document processing system as set forth in claim 6 wherein said table means comprises a first table for showing correspondences between said design instructions and respective table numbers corresponding to the design instructions, and a second table for showing correspondences between said area identifiers and color parameters for determining the color arrangement of the areas respectively having said identifiers.

8. A document processing system as set forth in claim 1 wherein said design parameter decision means comprises a knowledge data base for storing therein document design information including design parameters information and information for regulating instruction items from the design instruction means, and inference processing means for executing inference processing in accordance with responses to instruction signals from said design instruction means and document design information from said knowledge data base to make inferential design parameter determinations.

9. The document processing system of claim 1 wherein the document image is a color image, the data is color image data, and the parameter values relate to color characteristics.

10. The document processing system of claim 9 wherein said design instruction means comprises an operation panel to display design instruction items including kinds of edit targets and document finish image, and to select a desired design item from the design instruction items.

11. The document processing system of claim 9 wherein said design parameter decision means comprises table means which, in accordance with the instruction contents of said design instruction means, allows indexing of the parameter values concerning the document design.

12. The document processing system of claim 11 wherein said table means comprises a first table for showing correspondences between said design instructions and respective table numbers corresponding to the design instructions, and a second table for showing correspondences between said area identifiers and color parameters for determining the color arrangement of the areas respectively having said identifiers.

13. A document processing system comprising:

document image holding memory means for storing a document image defined by image data including at least some non-character image data;

target area instruction means for designating target areas to be edited each including at least a portion of the non-character image data for editing in the document image stored in said document image memory means, said target area instruction means further comprising a display which displays respective model images which have been prepared for respective kinds of edit target areas, and wherein the displayed model images guide a user on how to instruct the edit target area;

identifier providing means for giving an identifier to each of the edit target areas instructed by said target area means;

design instruction means for instructing a desired document design for an output document;

parameter decision means for deciding document design parameters for each of the edit target areas in accordance with an instruction from said design instruction means and said identifier for each of the edit target areas; and output image generation means for processing the document image in accordance with the parameters decided by said parameter decision means.

14. A document processing system as set forth in claim 13 wherein said design instruction means instructs a desired document design for the whole output document.

15. A document processing system as set forth in claim 13 wherein said design instruction means instructs a desired document design to part of an output document.

16. The document processing system of claim 13 wherein the document image is a color image, the data is color image data, and the parameter values relate to color characteristics.

17. A document processing system comprising:

document image input means for inputting a document image defined by image data including at least some non-character image data;

target area instruction means for designating a targeted area including at least a portion of the non-character image data for editing in the document image input from said document image input image means, said target area instruction means further comprising a display which displays respective model images which have been prepared for respective kinds of edit target areas and wherein the displayed model images guide a user on how to instruct the target area;

identifier processing means for giving an identifier to each of the edit target areas instructed by said target area instruction means;

design instruction means for instructing a desired document design to an output document;

parameter decision means for deciding document design parameters in accordance with an instruction by said design instruction means and said identifier for each of the edit target areas; and;

output image generation means for processing the document image in accordance with the parameters decided by said parameter decision means.

18. A document processing system as set forth in claim 17 wherein said design instruction means instructs a desired document design to the whole output document.

19. A document processing system as set forth in claim 17 wherein said design instruction means instructs a desired design to part of an output document.

20. The document processing system of claim 17 wherein the document image is a color image, the data is color image data, and the parameter values relate to color characteristics.

21. A document processing system comprising:

document image holding means for storing data representing a document image;

target area instruction means designating, for editing, an image target area in the document image stored in said document image holding means, said target area instruction means further comprising a display which displays respective model images which have been prepared for respective kinds of image target areas, and wherein the displaced model images guide a user on how to instruct the image target area;

target area extraction means for extracting the image target area designated by said target area instruction means from the document image;

design instruction means for generating at least a selected one of a plurality of design instructions to generate a desired document design for an output document;

design parameter decision means for determining values of design parameters determined in accordance with the one design instruction for the document design in the image target area and operative to modify the image data in the image target area; and output image generation means for processing and modifying, in accordance with the parameter values determined by said design parameter design means, the document image data in the image target area extracted by said target area extraction means thereby to produce an output image.

22. A document processing system comprising:

document image holding memory means for storing a document image;

target area instruction means designating, for editing, image target areas in the document image stored in said document image memory means, said target area instruction meads further comprising a display which displays respective model images which have been prepared for respective kinds of image target areas, and wherein the displayed model images guide a user on how to instruct the image target area;

identifier providing means applying an identifier to each of the image target areas instructed by said target area instruction means;

design instruction means for generating at least a selected one of a plurality of design instructions to generate a desired document design for an output document;

parameter decision means for deciding values of document design parameters for each image target area in accordance with at least one instruction from said design instruction means and the associated one of the identifiers for the image target areas; and output image generation means for processing and modifying the document image in accordance with the parameters decided by said parameter decision means.

23. A document processing system comprising:

document image input means for inputting a document image;

target area instruction means designating, for editing, image target areas in the document imager said target area instruction means further comprising a display which displays respective model images which have been prepared for respective kinds of image target areas, and wherein the displayed model images guide a user on how to instruct the image target area;

identifier processing means applying an identifier to each of the image target areas instructed by said target area instruction means;

design instruction means for generating at least a selected one of a plurality of design instructions to generate a desired design for an output document;

parameter decision means for deciding values of document design parameters in accordance with at least one instruction from said design instruction means and said identifiers for said image target areas; and output image generation means for processing and modifying the document image in accordance with the parameters decided by said parameter decision means.

* * * * *

UNITED STATES PATENT AND TRADEMARK OFFICE
CERTIFICATE OF CORRECTION

PATENT NO. : 5,671,429
DATED : September 23, 1997
INVENTOR(S) : Tsuyoshi TANAKA

It is certified that error appears in the above-identified patent and that said Letters Patent is hereby corrected as shown below:

Claim 21, column 13, line 66, "displaced" should read --displayed--.

Claim 22, column 14, line 24, "meads" should read --means--.

Claim 23, column 14, line 47, "imager" should read --image,--.

Signed and Sealed this

Third Day of November, 1998

Attest:

Attesting Officer

BRUCE LEHMAN

Commissioner of Patents and Trademarks